United States Patent
Hill et al.

(10) Patent No.: US 10,785,111 B2
(45) Date of Patent: Sep. 22, 2020

(54) FAULT-TOLERANT MONITORING OF TUNNELED IP FLOWS

(71) Applicant: NetScout Systems, Inc, Westford, MA (US)

(72) Inventors: Daniel Hill, Murphy, TX (US); Vignesh Janakiraman, Plano, TX (US)

(73) Assignee: NetScout Systems, Inc, Westford, MA (US)

( * ) Notice: Subject to any disclaimer, the term of this patent is extended or adjusted under 35 U.S.C. 154(b) by 0 days.

(21) Appl. No.: 15/601,475

(22) Filed: May 22, 2017

(65) Prior Publication Data
US 2018/0337826 A1  Nov. 22, 2018

(51) Int. Cl.
*H04L 12/24*  (2006.01)
*H04L 12/26*  (2006.01)
*H04L 12/46*  (2006.01)
*H04W 80/04*  (2009.01)

(52) U.S. Cl.
CPC ...... *H04L 41/0869* (2013.01); *H04L 12/4633* (2013.01); *H04L 41/22* (2013.01); *H04L 43/062* (2013.01); *H04L 43/0811* (2013.01); *H04L 43/0876* (2013.01); *H04L 41/0695* (2013.01); *H04L 43/0823* (2013.01); *H04W 80/04* (2013.01)

(58) Field of Classification Search
None
See application file for complete search history.

(56) References Cited

U.S. PATENT DOCUMENTS

| 7,808,889 | B1 | 10/2010 | Howard | |
|---|---|---|---|---|
| 9,479,951 | B2 | 10/2016 | Curtin et al. | |
| 2014/0344441 | A1* | 11/2014 | Janakiraman | H04L 43/12 709/224 |
| 2015/0172219 | A1* | 6/2015 | Johansson | H04L 69/325 370/419 |
| 2016/0006625 | A1 | 1/2016 | Javed et al. | |

FOREIGN PATENT DOCUMENTS

EP   2806678   11/2014

OTHER PUBLICATIONS

Extended European Search Report for European Patent Application No. 18173656.2, dated Sep. 3, 2108.
Office Action from the European Patent Office for European Patent Application No. EP18173656.2, dated Apr. 30, 2020.

* cited by examiner

*Primary Examiner* — Kodzovi Acolatse
*Assistant Examiner* — The Hy Nguyen
(74) *Attorney, Agent, or Firm* — Locke Lord LLP; Scott D. Wofsy; Christopher J. Capelli (57) ABSTRACT

A method for monitoring tunneled Internet Protocol (IP) traffic in a communication network includes monitoring tunnel signaling flows to determine relationships between tunnels and subscriber sessions for each established tunnel. A first tunnel signaling state is stored in a data repository for each established tunnel. The first tunnel signaling state is indicative of the determined relationship between the tunnel and corresponding subscriber sessions. A second tunnel signaling state is validated based on the stored first tunnel signaling state to identify incorrect association between a monitored tunnel and corresponding subscriber session, in response to detecting a monitoring gap.

20 Claims, 6 Drawing Sheets

FAULT-TOLERANT MONITORING OF TUNNELED IP FLOWS

FIELD OF THE INVENTION

This specification is directed, in general, to data communications, and, more particularly, to fault-tolerant monitoring of tunneled IP flows.

BACKGROUND OF THE INVENTION

Rapid growth of the telecommunications industry has fueled a strong competition for market share in mobile-IP communication devices and communication service plans. The growing need for expanded products and services has led to different vendors combining products, services and applications to meet the demands and the timetable of the market. As the complexity of the online mobile system has grown the requirement for maintaining the system and providing vendors and customers enough information to operate and use the mobile system has increased dramatically, the market now requires mobile communications vendors to provide guaranteed levels of performance and availability.

Typically, service assurance applications have a low tolerance for error. They may be used to collect and record data traffic statistics produced on a network. That recorded data traffic activity, or state, ages quickly. The states of the old and new data traffic instances' can be correlated if the older state is both recent and correct. Gaps in monitoring introduce errors. These gaps may result from application restarts or bad feeds (loss of signaling on a monitored link) or changing feeds (traffic redistribution over several monitored links). Currently, not all possible problems that might be caused from these gaps can be well-tackled. It would be advantageous for the network operators to increase the accuracy of a service assurance application when monitoring tunneled flows after interruptions in monitoring.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method for monitoring tunneled Internet Protocol (IP) traffic in a communication network includes monitoring tunnel signaling flows to determine relationships between tunnels and subscriber sessions for each established tunnel. A first tunnel signaling state is stored in a data repository for each established tunnel. The first tunnel signaling state is indicative of the determined relationship between the tunnel and corresponding subscriber sessions. A second tunnel signaling state is validated based on the stored first tunnel signaling state to identify incorrect association between a monitored tunnel and corresponding subscriber session, in response to detecting a monitoring gap.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

A communication network is a geographically distributed collection of nodes interconnected by communication links and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

As discussed above, an increase in mobile device users (e.g., subscribers) directly correlates to an increase in the amount of data transferred within in various mobile communication networks such as the General Packer Radio Service (GPRS) architecture and the 3GPP Evolved Packet System (EPS) architecture. With respect to data transfer, data packets are generally transferred in the GPRS architecture (e.g., within the packet switching core network) and the EPS architecture via a GPRS Tunneling Protocol (GTP), which is a defined group of IP-based communications protocols.

Operatively, GTP sessions are created within these networks to transfer data packets for a subscriber's User Equipment (UE). The data packets and the associated sessions are monitored and analyzed by network monitoring devices to provide important insight into potential network problems.

Embodiments of the present invention relate to performing analysis of performance problems/failures related to IP flows in a communications network. As noted above, service assurance applications can be defined with low error tolerance. Gaps in monitoring can introduce errors if older tunnel flow states are not properly validated in real time. A plurality of devices dedicated to monitoring data communicated via IP flows in the network is used as a data source for the performed analysis. The performed analysis enables validation of tunnel flow states by selectively examining the tunneled protocol IP address and comparing it with an address monitored early during the lifetime of the subscriber state. This technique of validating old monitored data fills a void in fault-tolerance for monitoring software solutions. Standard correlation in time techniques can be used as a measure of agreement between the old and new monitored signaling information. The signaling describes how the network creates and destroys IP tunnels described below. Various conventional monitoring techniques, however, neglect the content of these formed tunnels. Embodiments of the present invention provide a novel method that enhances accuracy of monitored IP flow data by providing means to validate its currency and IP tunnel content. Hence, the described network monitoring system can facilitate more efficient and effective method for fault-tolerant monitoring of tunneled IP flows in a wireless network, such as GPRS network.

Figure 1:
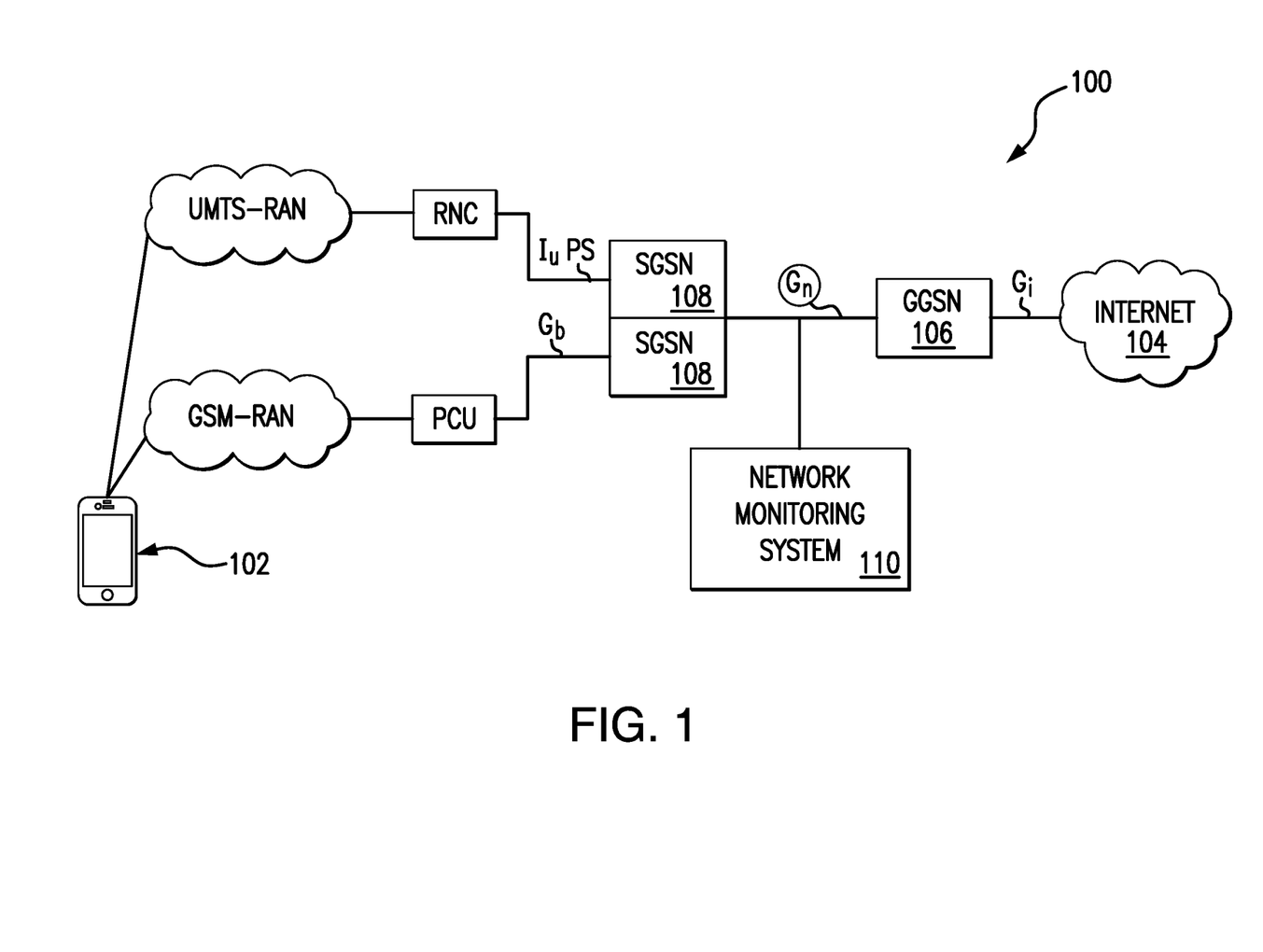
FIG. 1 shows an overview on the architecture of a General Packet Radio Service (GPRS) Core Architecture.

FIG. 1 illustrates a GPRS network 100. GPRS network 100 is a central part of the GPRS service and communicates subscriber data from UE 102 as IP packets to/from external networks such as the Internet 104. The GPRS system is an integrated part of the Global System for Mobile communications (GSM) network switching subsystem (not shown). GPRS network 100 provides mobility management, session management and transport for IP packet services in, for example, GSM and WCDMA networks.

As discussed above, GPRS network 100 uses GTP (e.g., an IP-based protocol) to transfer data packets. Primarily, GTP is the protocol which allows end users of a GSM or WCDMA network to move to various physical locations continuing to connect to the Internet 104 as if from one location at a Gateway GPRS support node (GGSN) 106. GTP carries subscriber data (e.g., from a subscriber's current serving GPRS support node (SGSN) 108) to GGSN 106 which handles a subscriber session (e.g., a GTP session) over a Gn interface (i.e. the network interface between GGSN(s) and SGSN(s)).

Further, GTP is comprised of (in part) of GTP control plane (GTP-C) data and GTP user plane (GTP-U) data. GTP-U data transfers subscriber data in separated tunnels for each Packet Data Protocol (PDP) context while GTP-C data incorporates, for example, setup and deletion of PDP contexts, verification of GSN reachability, updates (e.g., as subscribers move from one SGSN to another), etc.

GGSN 106, in particular, is responsible for internetworking between the GPRS network and external packet switched networks, like the Internet 104 and X.25 networks. Operatively, GGSN 106 receives data addressed to a specific user and checks if UE 102 has an active session. If UE 102 has an active session, GGSN 106 forwards data from UE 102 to SGSN 108, which serves the UE 102. If UE 102 does not have an active session (e.g., the UE is inactive), the data is discarded at GGSN 106. Notably, GGSN 106 enables the mobility (e.g., location changes) of UE 102 in the GPRS/UMTS networks. GGSN 106 maintains routing information necessary to tunnel protocol data units (PDUs) to the SGSN 108 that services a particular UE 102.

GGSN 106 also converts the GPRS packets coming from SGSN 108 into an appropriate packet data protocol (PDP) format (e.g., IP, X.25, etc.) and sends the converted data on the corresponding packet data network. GGSN 106 also converts PDP addresses of incoming data packets to a GSM address of the destination user (e.g., UE 102). The re-addressed data packets are sent to the responsible SGSN 108. For this purpose, GGSN 106 stores the current SGSN address of the user and user profile in its location register. GGSN 106 is responsible for IP address assignment and is the default router for the connected UE.

SGSN 108 is responsible for the delivery of data packets from and to mobile stations (e.g., UE 102) within its geographical service area. SGSN 108 performs packet routing and transfer, mobility management (attach/detach and location management), logical link management, and authentication and charging functions. The location register of the SGSN stores location information (e.g., current cell) and user profiles (e.g., IMSI, address(es) used in the packet data network) of all GPRS users registered with it.

Within GPRS network 100, a PDP context is a data structure present on both SGSN 108 and the GGSN 106 and contains the subscriber GTP session information when the subscriber has an active GTP session. When UE 102 wants to communicate within GPRS network 100, UE 102 first attaches and then activates a PDP context. In turn, PDP context data structure is allocated in the SGSN (e.g., the SGSN currently serving the subscriber) the corresponding GGSN serving the subscriber's access point. The PDP context data includes, for example: an IP address of UE 102, an International mobile subscriber identity (IMSI), a Tunnel Endpoint ID (TEID) at the GGSN, and a Tunnel Endpoint ID (TEID) at the SGSN. The TEID is a number allocated by the GSN which identifies the tunneled data related to a particular PDP context.

GPRS network 100 as illustrated also includes a network monitoring system 110 that monitors, for example, a Gn interface between SGSN 108 and GGSN 106. Network monitoring system 110 will be discussed with greater detail below.

Figure 2:
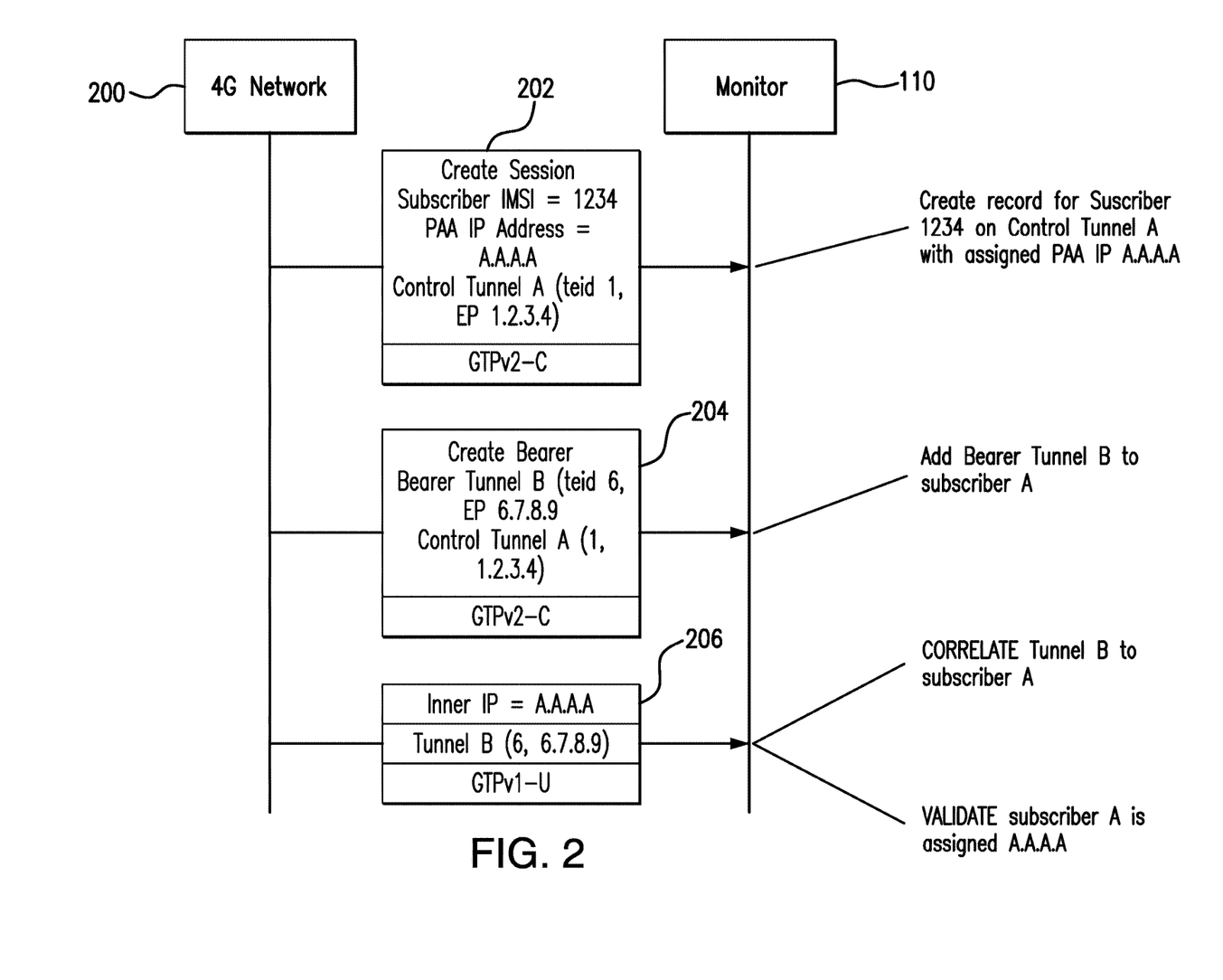
FIG. 2 shows an illustrative implementation of a GPRS Tunnel Protocol (GTP) validation in 4G networks.

FIG. 2 shows an illustrative implementation of a GTP validation in 4G networks in accordance with an embodiment of the present invention. Long Term Evolution (LTE) is a 4G standard for wireless communication of high-speed data for mobile phones and data terminals. LTE provides mobile broadband connectivity to UE within the LTE network at higher data rates than previous generation wireless networks. For example, the air interface for LTE, referred to as evolved UMTS terrestrial radio access network (E-UTRAN), utilizes multi-antenna and multi-user coding techniques to achieve downlink data rates of hundreds of megabits per second (Mbps) and uplink data rates of tens of Mbps.

Tunneling is a mechanism used to encapsulate a foreign payload protocol across an LTE network that normally does not support the foreign payload protocol. A tunneling protocol allows a network system to carry a foreign payload protocol, for example, carrying a RTP on User Datagram Protocol (UDP)/Internet Protocol (IP) over GTP versus Transmission Control Protocol (TCP)/IP, a Mobile IP (MIP), or Proxy Mobile IP (PMIP). Packets enter a tunnel at one end and exit the tunnel at the other end.

FIG. 2 depicts LTE network 200 and the network monitoring system 110. GTP-U datagrams may be correlated to subscriber's control signaling by a member packet's Fully Qualified Tunnel Endpoint Identifier (F-TEID). In an example embodiment, network monitoring system 110 uses control plane signaling (e.g., CREATE_SESSION_ATTEMPT message 202 and CREATE_BEARER_ATTEMPT message 204) to learn the session to F-TEID relationship, to agree S11 GTP-C TEID and IP address pairs, bearer context (bearer id, S1-U GTP-U TEID and IP address pairs) etc. The mobile terminal 102 may be identified with an IMSI. The network monitoring system 110 may track the connection using S11-MME GTP-C TEID and MME IP address pair and S11-SGW GTP-C TEID and SGW IP address pair.

More specifically (as shown in FIG. 2), network monitoring system 110 may use control plane signaling messages 202 and 204 to create a tunnel signaling state record for a subscriber with IMSI="1234" on control tunnel A with assigned Packet Data Network (PDN) Address Allocation (PAA) IP "A.A.A.A." Network monitoring system 110 may also add bearer tunnel B to subscriber A. The data bearer channel GTP user plane (GTP-U) packets 206 of the tunnel have the same TEID. In this embodiment, network monitoring system 110 uses the information gathered from the control plane signaling 202, 204 to monitor the tunnel management of the user plane. For example, in response to receiving GTP-U packet 206 (shown in FIG. 2), network monitoring system 110 may correlate tunnel B to the subscriber A and may validate that IP address "A.A.A.A." is assigned to subscriber A's user equipment.

At least in some embodiments, network monitoring system 110 may also learn assigned mobile subscriber IP addresses or address prefixes from GTP-C or some auxiliary assignment protocol, like DHCP. Tunnel signaling state records maintained by the network monitoring system 100 provide an opportunity to see if a particular F-TEID mapping relates to the session over time. Network monitoring system 110 may also detect if mappings and/or correlation rules created for a subscriber has become stale and may take appropriate action if needed.

Figure 3:
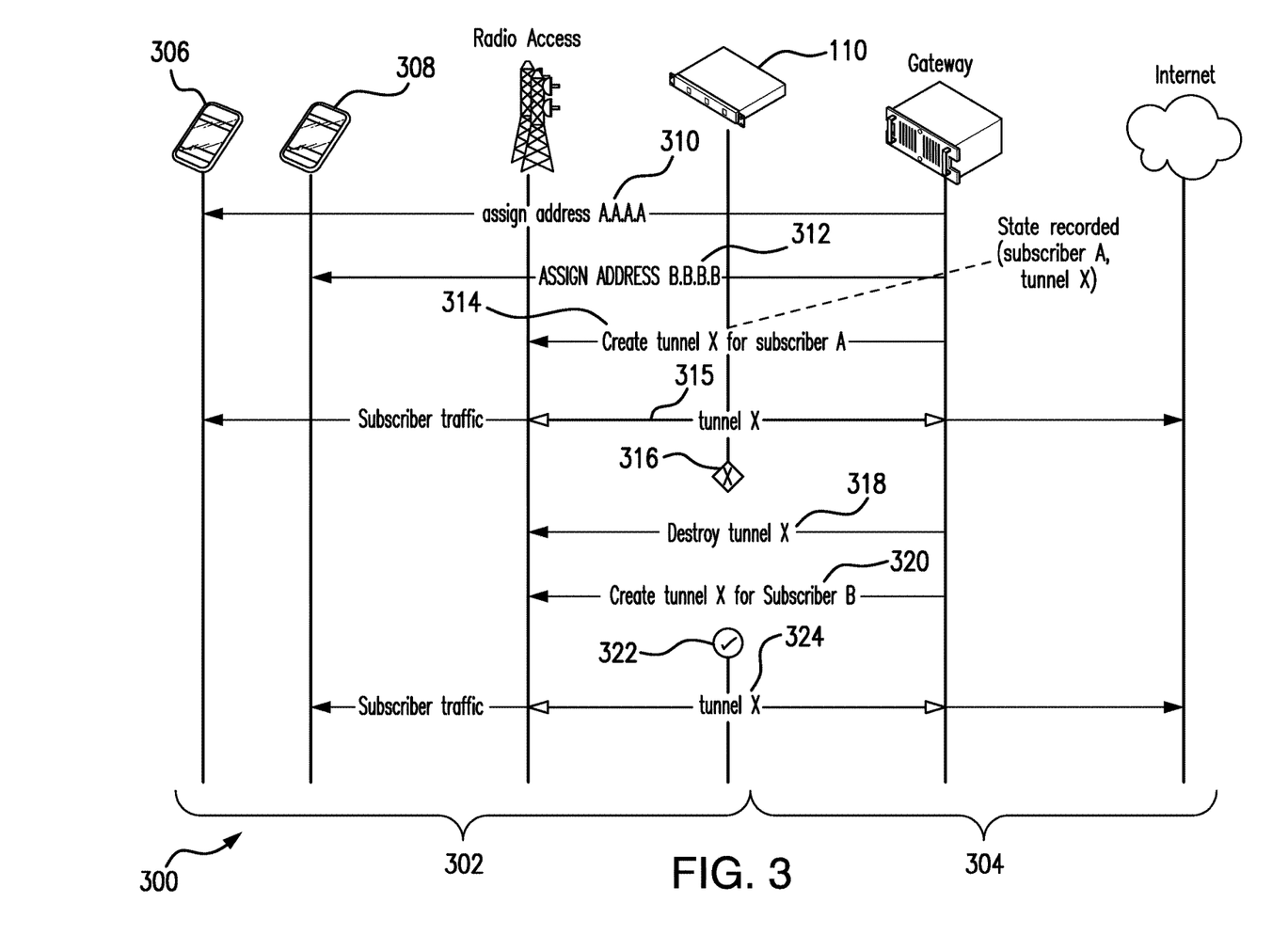
FIG. 3 is a schematic diagram illustrating monitoring gap issue within a 4G network.

FIG. 3 is a schematic diagram illustrating monitoring gap issue within a 4G network. FIG. 3 shows network monitoring system 110 hosting a service assurance application that is configured to monitor various application traffic flows over a 4G wireless network 300 from a subscriber through the radio access portion 302 and across the network core 304. In this example, network monitoring system 110 may observe that devices of two subscribers (e.g., first subscriber's device 306 and second subscriber's device 308) attach to network 300. The network 300 assigns IP addresses to the devices 306 and 308 so they may signal other entities on the internet. In one embodiment, network 300 may include one or more DHCP servers (not shown in FIG. 3). The DHCP servers preferably share an IP table (e.g., DHCP servers assign IP addresses to devices and the assignments are stored in a table accessible to the multiple servers so that they do not attempt to assign different IP addresses to the same device). In this example, first device 306 is assigned a first IP address 310 while the second device 308 is assigned a second IP address 312. Network 300 also creates a tunnel X for that signaling to fulfill certain QOS guarantees to the subscriber, as well as hide its own topology from the subscriber and relay nodes. At this point, network monitoring system 110 records tunnel signaling state in a tunnel signaling state record, where the recorded state associates first subscriber device 306 with tunnel X 314. Once the signaling state is recorded, network monitoring system 110 may start monitoring user plane traffic flowing 315 through the tunnel X in the monitored telecommunications network 300. At some point, the monitoring link may be suspended 316 for some maintenance action. The monitored network 300 meanwhile may release 318 the tunnel X from the first subscriber's device 306 and may assign it (at 320) to the second subscriber's device 308. After receiving an indication that the maintenance operation has been performed, for example, after restarting the network monitoring system 110, the monitoring link may be restored 322. Since the network monitoring system 110 has no knowledge of the reassigned network tunnel 320, it wrongly associates user plane traffic flowing 324 through the network tunnel X as first subscriber device's 306 activity.

In the illustrated situation, the network monitoring system 110 blindly applies the old correlation rule against newly monitored data (new device connected to a particular tunnel) for tap failures. Network monitoring system 110 may save state that can be restored on recovery from application failures. However, various network monitoring techniques provide no means to discover changed tunneling without monitoring all control signaling. One possible recourse in this situation is to allow data to age out. But this does not even consider that data "aging" effects may never occur. Further, this bad tunnel flow state may also be used to improperly increase the measurements of a particular device (e.g., first subscriber's device 306 originally assigned to the monitored tunnel), and could produce other misleading monitoring results if the subscriber's activity is wrongly matched.

In order to overcome these limitations, various embodiments of the present invention utilize a unique invariant marker associated with a subscriber that is separate from the control messages used to create and destroy tunnels. The technique discussed below is applicable to monitoring any tunneling protocol that transports data flows and provides more accurate data for subsequent data flow analysis. In one embodiment, the transported address serves as the unique invariant marker associated with a subscriber for tunneled IP traffic. Typically, each distinct address (e.g., assigned IP address) is associated with one subscriber. By recording and matching a tunneled IP address against what was assigned early in the lifetime of a subscriber's network session, the disclosed network monitoring system can check itself by comparing the IP address associated with the flow traffic against the stored, last-assigned tunneled IP address to determine whether the monitored tunnel has been reassigned. Furthermore, the disclosed network monitoring system may remove one or more correlation rules that have become stale over time.

Figure 4:
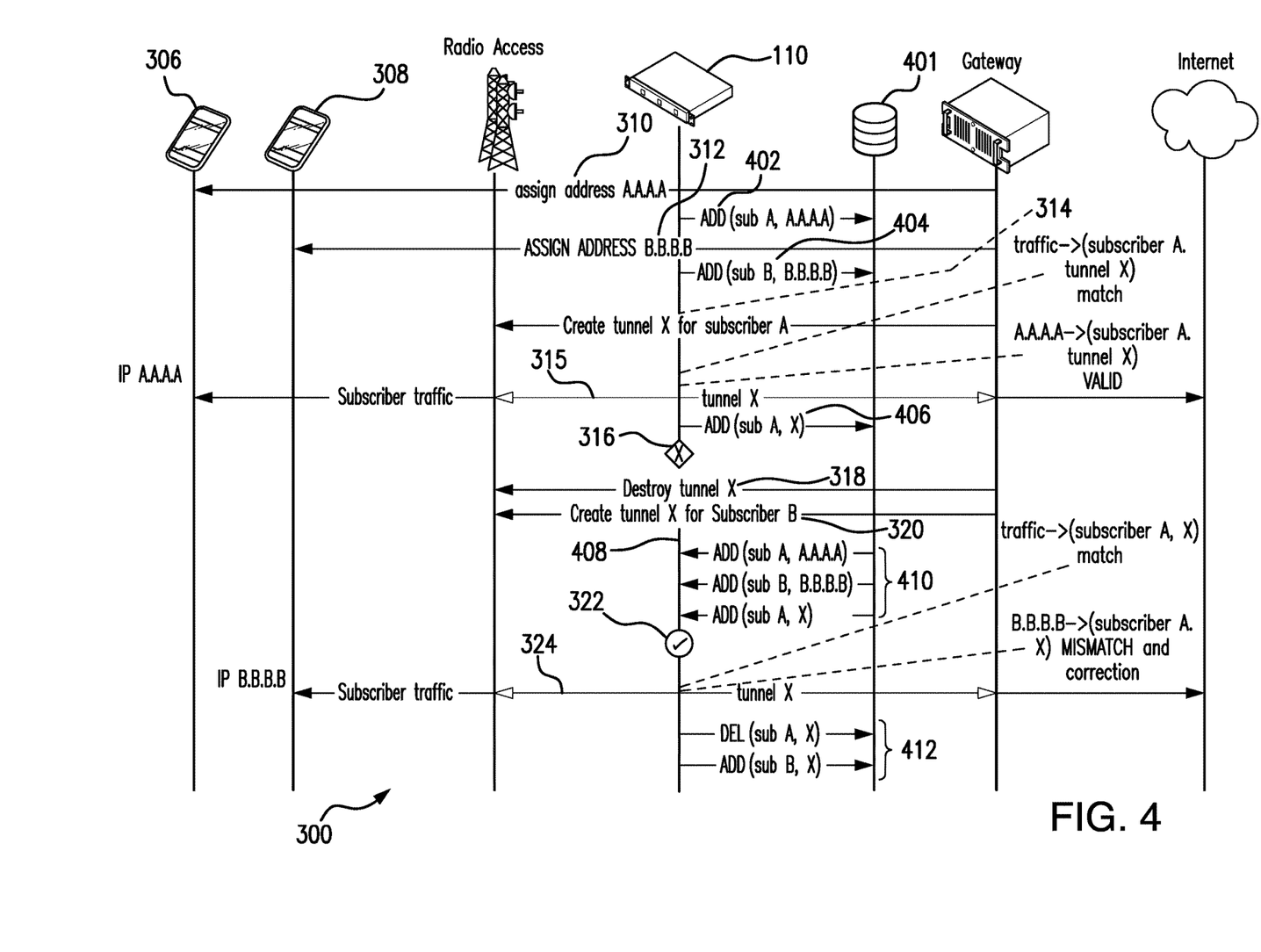
FIG. 4 illustrates monitoring gap issue recovery from application failure in accordance with illustrative embodiments of the present invention.

FIG. 4 illustrates monitoring gap issue recovery from application failure within a 4G network in accordance with illustrative embodiments of the present invention. In the illustrated embodiment, network monitoring system 110 may observe that devices of two subscribers (e.g., first subscriber's device 306 and second subscriber's device 308) attach to network 300. As described above, the first device 306 may be assigned a first IP address 310 while the second device 308 is assigned a second IP address 312. However, the network monitoring system 110 also makes note of the assigned IP addresses for the first 306 and second 308 subscriber wireless devices. More specifically, the network monitoring system 110 stores first subscriber device's IP address 310 and second subscriber device's IP address 312 in a data repository 401 in steps 402 and 404, respectively. Once the network 300 creates a tunnel X, network monitoring system 110 records tunnel signaling state in a tunnel signaling state record, where the recorded state associates first subscriber device 306 with tunnel X 314. Subsequently, network monitoring system 110 may start monitoring user plane traffic flowing 315 through the tunnel X in the monitored telecommunications network 300. Just like in case illustrated in FIG. 3, at some point, the monitoring link may be suspended 316 for some maintenance action—for example, network monitoring system restart. In this case, prior to the restarting point, network monitoring system 110 also stores the association between the first subscriber's device and the tunnel X in step 406.

Continuing with the embodiment illustrated in FIG. 4, while the network monitoring system 110 is restarting, the monitored network 300 may release (at 318) the tunnel X from the first subscriber's device 306 and may assign it (at 320) to the second subscriber's device 308. According to an embodiment of the present invention, after the network monitoring system 110 restarts 408, but prior to the monitoring link being restored 322, the network monitoring system retrieves (at 410) last assigned IP address associated with the monitored tunnel as well as subscriber devices addresses 310 and 312 from the repository 401. Furthermore, in this embodiment, prior to restarting monitoring, the network monitoring system 110 performs an additional validation step. In this validation step the network monitoring system 110 determines that destination IP address of the user plane traffic flowing (324) through the network tunnel X does not correlate with the last assigned IP address associated with the monitored tunnel. Accordingly, the network monitoring system 110 may update the wrong association between the monitored tunnel and tunneled IP address in 412.

Figure 5:
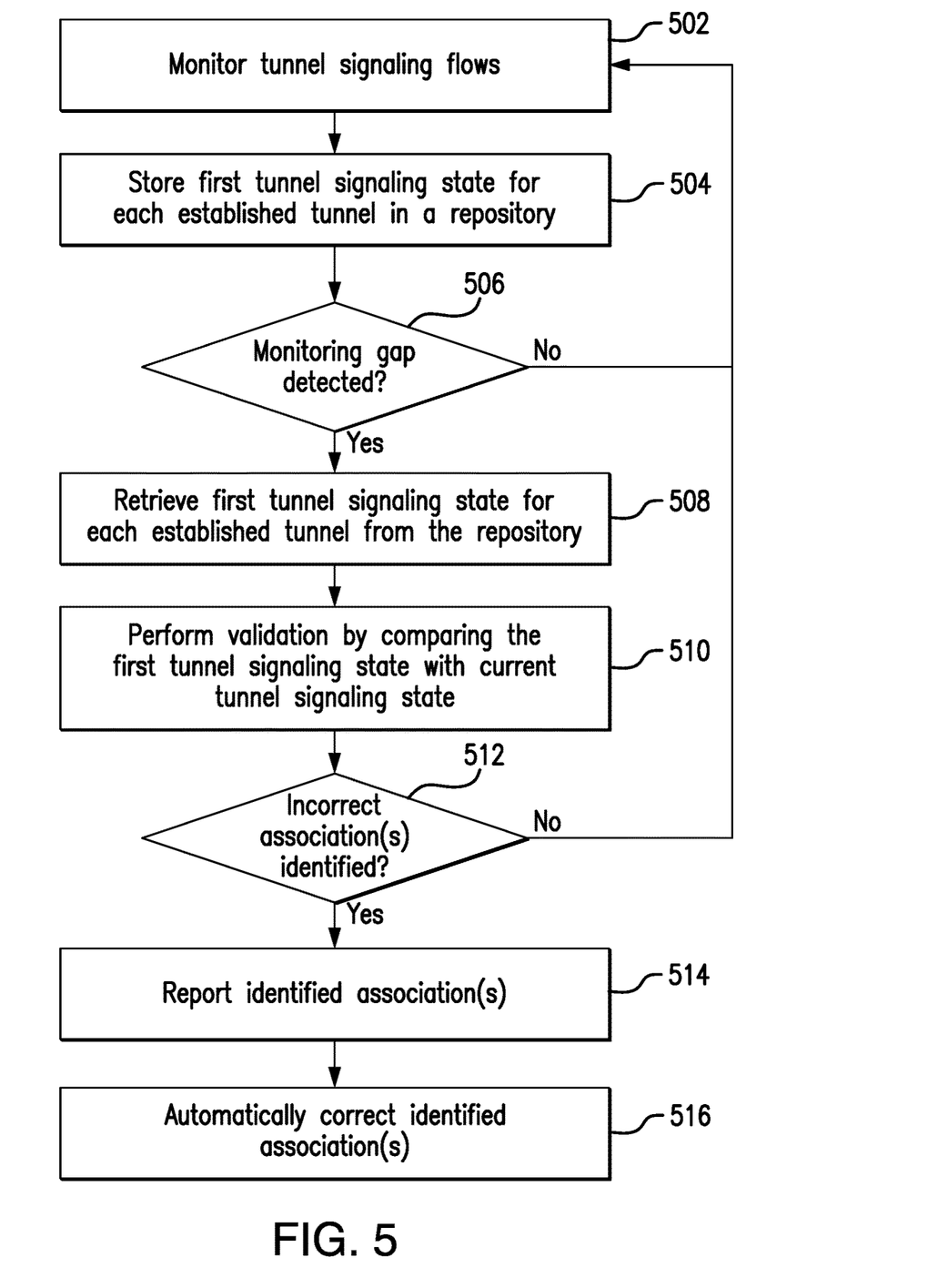
FIG. 5 is a flowchart illustrating a method for monitoring tunneled Internet Protocol (IP) traffic in a communications network in accordance with illustrative embodiments of the present invention.

FIG. 5 is a flowchart illustrating a method for monitoring tunneled IP traffic in a communications network in accordance with illustrative embodiments of the present invention. Before turning to the description of FIG. 5, it is noted that the flow diagrams shown therein are described, by way of example, with reference to components shown in FIGS. 1-4, although these operational steps may be carried out in any system and are not limited to the scenario shown in the aforementioned figure. Additionally, the flow diagram in FIG. 5 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

At step 502, a tunneled IP traffic tracker 612a (described below in conjunction with FIG. 6) starts monitoring tunnel signaling flows in a wireless network to determine relationships between network tunnels and subscriber sessions for each established network tunnel. It should be noted that this step involves the tunneled IP traffic tracker 612a monitoring exchanges of GTP control packets in active user sessions in the monitored network, such as an LTE network. In one embodiment, the a tunneled IP traffic tracker 612a monitors exchanged GTP packets to determine relationships between the monitored network tunnels and corresponding subscriber sessions. The GTP traffic is high volume. For example, the combined traffic at SGSN locations 108 (shown in FIG. 1) may correspond to 1+ million subscribers. Thus, tunneled traffic needs to be efficiently and properly associated with subscriber sessions by correlating information indicating the respective tunnel endpoint IP addresses of a control session and a data session of a subscriber. More specifically, at step 502, the tunneled IP traffic tracker 612a determines a relationship between a GTP subscriber session for which the network tunnel was established and F-TEIDs of packets transmitted through the tunnel. The F-TEIDs represent a combination of a destination IP address and a TEID for each GTP packet. For some embodiments, the tunneled IP traffic tracker 612a analyzes the GTP packets and determines F-TEIDs that are created, modified, and/or dropped for subscriber sessions.

According to an embodiment of the present invention, the tunneled IP traffic tracker 612a is further configured to store tunnel signaling state for each established network tunnel in a repository in the wireless network (e.g., 3GPP LTE network), represented by the network repository 401 in FIG. 4 (step 504) For instance, in certain embodiments, the network repository 401 can be a dedicated persistent storage device. In example embodiment, the tunneled IP traffic tracker 612a can store a group of tunnel signaling state records in the network repository corresponding to a respective group of monitored packet-based tunnels. The tunneling state records are indicative of the relationships (determined based on the encapsulated packets in step 502) between the network tunnel and corresponding subscriber sessions. As a non-limiting example, in a scenario in which the wireless network 300 is a 3GPP LTE network, the tunneling state may include at least one of tunnel information, bearer parameters, and an allocated IP address. For instance, the stored tunneling state may contain at least some of the following information: an IP address or IP address prefix assigned to a subscriber device, an IMSI of the subscriber's device, an international mobile equipment identifier (IMEI) of the subscriber's device, a Mobile Subscriber Integrated Services Digital Network-Number (MSISDN) of the subscriber's device, F-TEIDs associated with IP multimedia subsystem (IMS) voice/data services, F-TEIDs associated with global internet services, F-TEIDs associated with multimedia messaging services (MMS), one or more timestamps associated with subscriber related activities and one or more network nodes/resources with which subscriber's device is interacting.

According to an embodiment of the present invention, at 506, the tunneled IP traffic tracker 612a may periodically check for monitoring gaps. In one exemplary embodiment, the tunneled IP traffic tracker 612a may determine whether monitoring disruption has occurred due to a system level reboot or a similar maintenance action. A system level reboot refers to a reboot in which most of the programs, including all network monitoring programs, may be terminated and reloaded, thus creating a temporary gap in monitoring. As explained above in conjunction with FIGS. 3 and 4, the LTE network may reassign one or more monitored network tunnels from one mobile station (UE) session to another mobile station while one or more current monitoring sessions may experience loss or degradation, according to one embodiment of the present invention. If the tunneled IP traffic tracker 612a does not detect any expected/unexpected monitoring interruptions (decision block 506, "No" branch), the tunneled IP traffic tracker 612a may return back to monitoring tunnel signaling flows (step 502).

In response to detecting monitoring session interruptions/ degradations (decision block 506, "Yes" branch), at step 508, the tunneled IP traffic tracker 612a can query the network repository 401 for tunnel signaling state for each established channel. Next, at 510, once the tunneled IP traffic tracker 612a resumes monitoring network bearers (e.g., GTP tunnels), it performs a validation step by comparing retrieved tunneling state information with currently observed tunneling state information for each established tunnel to identify incorrect associations between the monitored tunnels and corresponding subscriber sessions. More specifically, at step 508, the tunneled IP traffic tracker 612a may compare at least an IP address or an IP address prefix allocation to the subscriber's device of a particular GTP packet, obtained after the monitoring gap, with the IP address or the IP address prefix of the subscriber's device stored in the retrieved tunneling state.

According to an embodiment of the present invention, at step 512, the tunneled IP traffic tracker 612a may identify one or more incorrect associations. In one embodiment, the tunneled IP traffic tracker 612a may determine incorrect association(s) based on detected mismatches between the compared IP addresses or compared IP address prefixes. If the tunneled IP traffic tracker 612a does not detect any incorrect associations (e.g., if the LTE network has not reassigned any of the monitored network tunnels during the monitoring gap) (decision block 512, "No" branch), the tunneled IP traffic tracker 612a may return back to analyzing the GTP packets and determining F-TEIDs that are created, modified, and/or dropped for subscriber sessions (step 502).

In response to identifying one or more incorrect associations (decision block 512, "Yes" branch), at step 514, the tunneled IP traffic tracker 612a may report the identified incorrect associations to a user via a Graphical User Interface (GUI), for example. In some embodiments, the tunneled IP traffic tracker 612a may be further configured to automatically correct the identified association(s) at step 516. In other words, the tunneled IP traffic tracker 612a may be further configured to automatically correct the identified association(s) between the monitored network tunnel and the corresponding subscriber session based on the comparison of the subscriber and session data.

Figure 6:
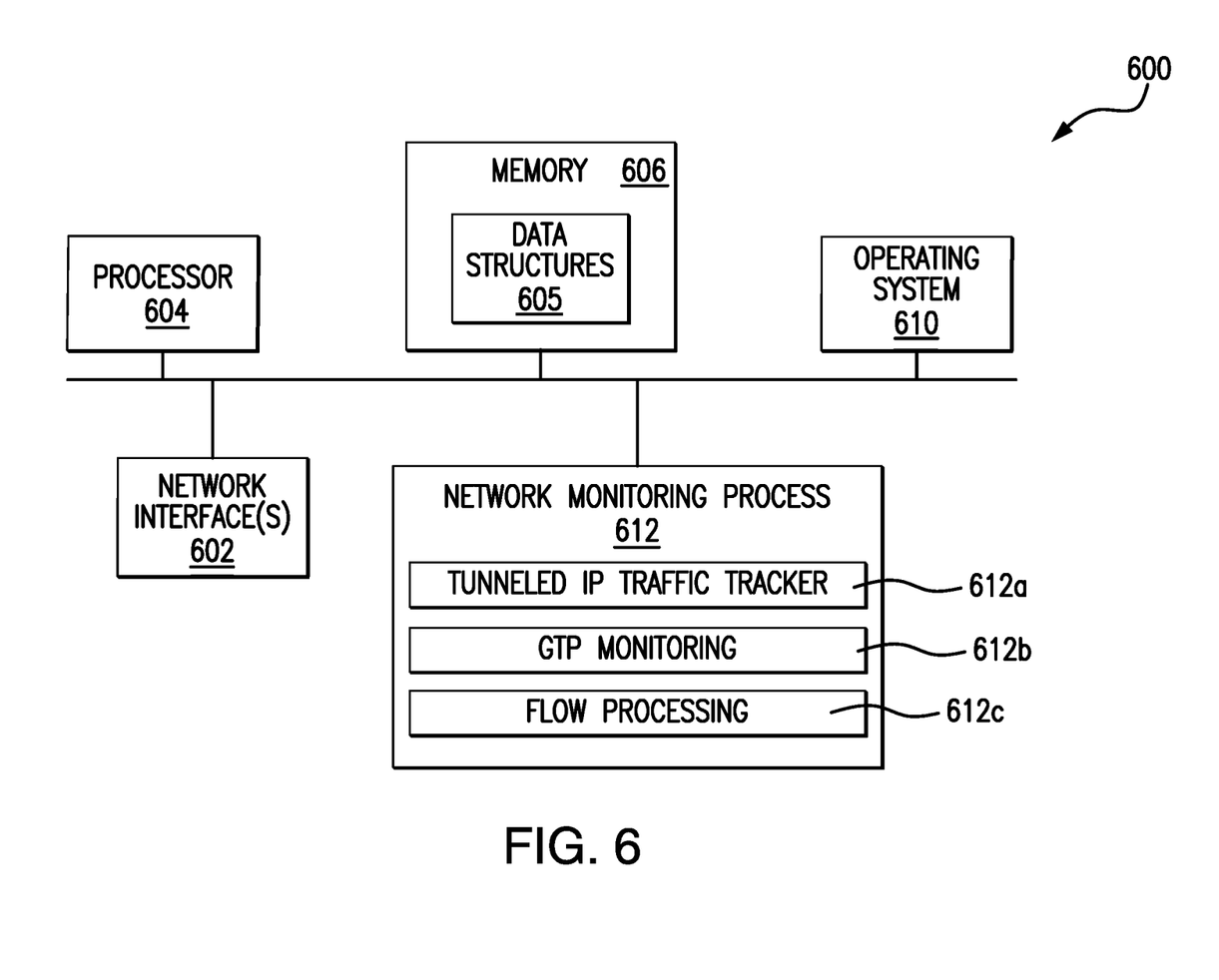
FIG. 6 is a schematic block diagram of an example network monitoring node/device that may be used with one or more embodiments described herein.

FIG. 6 is a schematic block diagram of an example network monitoring node/device 600 that may be used with one or more embodiments described herein, e.g., as part of network monitoring system 110 or as one or more modules of network monitoring system (ref. FIG. 1-5, above). The monitoring device 600 may comprise one or more network interfaces 602, at least one processor 604 (e.g., a microcontroller), and a memory 606 interconnected by a system bus 608.

The network interface(s) 602 contain the mechanical, electrical, and signaling circuitry for communicating data over physical and/or wireless links coupled to networks 100 and 300. The network interfaces may be configured to transmit and/or receive data using a variety of different communication protocols, including, inter alia, TCP/IP, UDP, wireless protocols (e.g., IEEE Std. 802.15.4, Wi-Fi, Bluetooth®), Ethernet, powerline communication (PLC) protocols, etc.

The memory 606 comprises a plurality of storage locations that are addressable by the processor 604 and the network interfaces 602 for storing software programs and data structures 605 associated with the embodiments described herein. As noted above, certain devices may have limited memory or no memory (e.g., no memory for storage other than for programs/processes operating on the device). The processor 604 may comprise necessary elements or logic adapted to execute the software programs and manipulate data structures. An operating system 610, portions of which are typically resident in memory 606 and executed by the processor 604, functionally organizes the device by, inter alia, invoking operations in support of software processes and/or services executing on the device. These software processes and/or services may comprise network monitoring process/services 612. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Network monitoring process (services) 612 contains computer executable instructions executed by the processor 604 to perform functions such as a tunneled IP traffic tracking process 612 a ("tunneled IP traffic tracker"), a GTP packet monitoring process 612 b, and a flow processing process 612c.

Illustratively, the techniques described herein may be performed by hardware, software, and/or firmware, such as in accordance with the network monitoring process 612, which may contain computer executable instructions executed by the processor 604 (or independent processor of interfaces 602) to perform functions relating to the techniques described herein.

Advantageously, the various embodiments described herein provide more efficient service assurance solution (that uses real-time monitoring, management and maintenance capabilities) because of improved fault-tolerance and accuracy. These embodiments allow the real-time operational monitoring and management solution to provide more accurate data and provide it timely after maintenance on the solution. Described embodiments protect data integrity in the face of interruptions to a data feed, such as a customer equipment upgrade or network topology change. Additionally or alternatively, some embodiments of the present invention serve as a self-correction mechanism capable of removing detected internal errors for the monitoring application. With such improved techniques, operational costs could be greatly reduced.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring tunneled Internet Protocol (IP) traffic in a communications network, the method comprising steps of:
monitoring tunnel signaling flows to determine relationships between tunnels and subscriber sessions for each established tunnel;
analyzing General Packet Radio Service (GPRS) Tunnel Protocol (GTP) packets in a GTP session to determine whether Fully Qualified Tunnel Endpoint Identifiers (F-TEIDs) of packets transmitted through the tunnel are created, modified and dropped for subscriber sessions wherein each F-TEID represents a combination of a destination IP address and a tunnel endpoint identifier (TEID) for a GTP packet;
storing first tunnel signaling state in a data repository for each established tunnel, the first tunnel signaling state is indicative of the determined relationship between the tunnel and corresponding subscriber sessions; and
validating second tunnel signaling state based on the stored first tunnel signaling state to identify incorrect association between a monitored tunnel and corresponding subscriber session, in response to detecting a monitoring gap such that validation of tunnel flow states is performed prior to establishing monitoring the second tunnel, by retrieving a last assigned IP address associated with the first tunnel and stored subscriber addresses associated with the subscriber sessions to determine that the destination IP address of user plane traffic flowing through the second tunnel does not correlate with the last assigned IP address associated with the first tunnel.

2. The method of claim 1, further comprising the step of reporting the identified incorrect associations to a user via a user interface.

3. The method of claim 1, wherein the step of monitoring the tunnel signaling flows comprises monitoring GTP (GPRS (General Packet Radio Service) Tunneling Protocol) packets.

4. The method of claim 3, wherein the determined relationship between the tunnel and the corresponding subscriber session comprises a relationship between a GTP subscriber session for which the tunnel was established and the F-TEIDs packets transmitted through the tunnel.

5. The method of claim 4, wherein the communications network comprises a Long Term Evolution (LTE) network.

6. The method of claim 5, wherein the LTE network reassigns the monitored tunnel from one mobile station session to another mobile station session during the monitoring gap and wherein the step of validating the second tunnel signaling state based on the stored first tunnel signaling state identifies incorrect association between the monitored tunnel and the corresponding subscriber session.

7. The method of claim 4, wherein the first tunnel signaling state and the second tunnel signaling state include at least some of the following: an IP address or IP address prefix assigned to a subscriber device, an international mobile subscriber identity (IMSI) of the subscriber's device, an international mobile equipment identifier (IMEI) of the subscriber's device, a Mobile Subscriber Integrated Services Digital Network-Number (MSISDN) of the subscriber's device, F-TEIDs associated with IP multimedia subsystem (IMS) voice/data services, F-TEIDs associated with global internet services, F-TEIDs associated with multimedia messaging services (MMS), one or more timestamps associated with subscriber related activities and one or more network nodes/resources with which subscriber's device is interacting.

8. The method of claim 7, wherein the step of validating the second tunnel signaling state comprises comparing at least an IP address or an IP address prefix assigned to the subscriber's device in the second signaling state with the IP address or the IP address prefix of the subscriber's device stored in the first signaling state and identifying an incorrect association, in response to detecting a mismatch between the compared IP addresses or compared IP address prefixes.

9. The method of claim 2, further comprising correcting the identified association between the monitored tunnel and the corresponding subscriber session.

10. A network device for monitoring tunneled Internet Protocol (IP) traffic in a communications network, the network device comprising:
a memory configured to store instructions;
a processor disposed in communication with the memory and coupled to one or more network interfaces, wherein the processor upon execution of the instructions is configured to:
monitor tunnel signaling flows to determine relationships between tunnels and subscriber sessions for each established tunnel;
analyze General Packet Radio Service (GPRS) Tunnel Protocol (GTP) packets in a GTP session to determine whether Fully Qualified Tunnel Endpoint Identifiers (F-TEIDs) of packets transmitted through the tunnel are created, modified and dropped for subscriber sessions wherein each F-TEID represents a combination of a destination IP address and a tunnel endpoint identifier (TEID) for a GTP packet;
store first tunnel signaling state in a data repository for each established tunnel, the first tunnel signaling state is indicative of the determined relationship between the tunnel and corresponding subscriber sessions; and
validate second tunnel signaling state based on the stored first tunnel signaling state to identify incorrect association between a monitored tunnel and corresponding subscriber session, in response to detecting a monitoring gap, and prior to establishing monitoring the second tunnel, retrieving a last assigned IP address associated with the first tunnel and stored subscriber addresses associated with the subscriber sessions to determine that the destination IP address of user plane traffic flowing through the second tunnel does not correlate with the last assigned IP address associated with the first tunnel.

11. The network device of claim 10, wherein the network device is further configured to report the identified incorrect associations to a user via a user interface.

12. The network device of claim 10, wherein the network device configured to monitor the tunnel signaling flows is further configured to monitor GTP (GPRS (General Packet Radio Service) Tunneling Protocol) packets.

13. The network device of claim 12, wherein the determined relationship between the tunnel and the corresponding subscriber session comprises a relationship between a GTP subscriber session for which the tunnel was established and the F-TEIDs packets transmitted through the tunnel.

14. The network device of claim 13, wherein the communications network comprises a Long Term Evolution (LTE) network.

15. The network device of claim 14, wherein the LTE network reassigns the monitored tunnel from one mobile station session to another mobile station session during the monitoring gap and wherein the network device configured to validate the second tunnel signaling state based on the stored first tunnel signaling state is further configured to identify incorrect association between the monitored tunnel and the corresponding subscriber session.

16. The network device of claim 13, wherein the first tunnel signaling state and the second tunnel signaling state include at least some of the following: an IP address or IP address prefix assigned to a subscriber device, an international mobile subscriber identity (IMSI) of the subscriber's device, an international mobile equipment identifier (IMEI) of the subscriber's device, a Mobile Subscriber Integrated Services Digital Network-Number (MSISDN) of the subscriber's device, F-TEIDs associated with IP multimedia subsystem (IMS) voice/data services, F-TEIDs associated with global internet services, F-TEIDs associated with multimedia messaging services (MMS), one or more timestamps associated with subscriber related activities and one or more network nodes/resources with which subscriber's device is interacting.

17. The network device of claim 16, wherein the network device configured to validate the second tunnel signaling state is further configured to compare at least an IP address or an IP address prefix assigned to the subscriber's device in the second signaling state with an IP address or an IP address prefix of the subscriber's device stored in the first signaling state and configured to identify an incorrect association, in response to detecting a mismatch between the compared IP addresses or compared IP address prefixes.

18. The network device of claim 11, wherein the network device is further configured to correct the identified association between the monitored tunnel and the corresponding subscriber session.

19. A non-transitory computer readable storage medium structured to store instructions, the instructions when executed, cause a processor in a network device for monitoring tunneled Internet Protocol (IP) traffic in a communications network to:
monitor tunnel signaling flows to determine relationships between tunnels and subscriber sessions for each established tunnel;
analyze General Packet Radio Service (GPRS) Tunnel Protocol (GTP) GTP packets in a GTP session to determine whether Fully Qualified Tunnel Endpoint Identifiers (F-TEIDs) of packets transmitted through the tunnel are created, modified and dropped for subscriber sessions wherein each F-TEID represents a combination of a destination IP address and a tunnel endpoint identifier (TEID) for a GTP packet;
store first tunnel signaling state in a data repository for each established tunnel, the first tunnel signaling state is indicative of the determined relationship between the tunnel and corresponding subscriber sessions; and
validate second tunnel signaling state based on the stored first tunnel signaling state to identify incorrect association between a monitored tunnel and corresponding subscriber session, in response to detecting a monitoring gap, and prior to establishing monitoring the second tunnel, retrieving a last assigned IP address associated with the first tunnel and stored subscriber addresses associated with the subscriber sessions to determine that the destination IP address of user plane traffic flowing through the second tunnel does not correlate with the last assigned IP address associated with the first tunnel.

20. The non-transitory storage medium of claim 19, wherein the network device is further configured to report the identified incorrect associations to a user via a user interface.

\* \* \* \* \*